(12) United States Patent
Claus

(10) Patent No.: US 7,089,737 B2
(45) Date of Patent: Aug. 15, 2006

(54) HOUSING FOR A TURBOCHARGER

(75) Inventor: Hartmut Claus, Gruenstadt (DE)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 10/998,515

(22) Filed: Nov. 29, 2004

(65) Prior Publication Data

US 2005/0144946 A1 Jul. 7, 2005

(30) Foreign Application Priority Data

Nov. 28, 2003 (EP) .................................. 03027267

(51) Int. Cl.
| | | |
|---|---|---|
| B22C 9/10 | (2006.01) | |
| F02B 37/02 | (2006.01) | |
| F02B 33/44 | (2006.01) | |
| F02B 29/04 | (2006.01) | |
| F02B 67/00 | (2006.01) | |
| F02B 33/36 | (2006.01) | |
| F02B 67/10 | (2006.01) | |
| F02B 29/00 | (2006.01) | |
| F02B 33/00 | (2006.01) | |
| F01N 7/10 | (2006.01) | |
| F04D 25/04 | (2006.01) | |
| F02F 1/24 | (2006.01) | |
| F02C 6/12 | (2006.01) | |
| F02M 35/10 | (2006.01) | |

(52) U.S. Cl. ...................... 60/605.1; 60/323; 60/597; 123/559.1

(58) Field of Classification Search .......... 60/605.1, 60/323, 597; 123/559.1
See application file for complete search history.

(56) References Cited

U.S. PATENT DOCUMENTS

| 4,294,073 | A | * | 10/1981 | Neff .......................... 60/597 |
|---|---|---|---|---|
| 4,474,007 | A | | 10/1984 | Kronogard et al. |
| 4,616,482 | A | | 10/1986 | Kronogard et al. |
| 4,674,284 | A | | 6/1987 | Kronogard et al. |
| 6,062,024 | A | * | 5/2000 | Zander et al. .............. 60/597 |
| 6,079,394 | A | | 6/2000 | Abthoff et al. |

(Continued)

FOREIGN PATENT DOCUMENTS

DE 197 56 985 C1 3/1999

(Continued)

*Primary Examiner*—Sheldon J Richter
(74) *Attorney, Agent, or Firm*—Akerman Senterfitt Greg Dziegielewski

(57) ABSTRACT

A housing for a turbocharger comprises a housing shell which surrounds, at least partially, a rotor space, at least one manifold of a combustion engine, a pipe for connecting the housing shell with at least one manifold of the combustion engine, and a cylinder head of said combustion engine. All these parts are integrally cast as one single piece. This may be effected by a method which comprises the steps of: joining and bonding sand cores for part of a housing shell of the turbocharger with sand cores for shaping the cavities of the manifold, and these, in turn, with sand cores for shaping the cylinder head. Subsequently, inserting said joint and bonded sand cores into respective firmly interconnected molds for molding said part of a housing shell of said turbocharger, for said manifold and said cylinder head, and filling molten metal into said molds and allowing solidification of said metal. After that, the integrally cast single piece of part of the housing shell of the turbocharger together with the manifold and the cylinder head is released and the cores are removed.

6 Claims, 2 Drawing Sheets

U.S. PATENT DOCUMENTS

| | | | |
|---|---|---|---|
| 6,256,990 B1 * | 7/2001 | Itoh ............................ | 60/597 |
| 6,619,275 B1 | 9/2003 | Wiik | |
| 6,688,103 B1 * | 2/2004 | Pleuss et al. .............. | 60/605.1 |
| 6,892,532 B1 * | 5/2005 | Bruce et al. .................. | 60/323 |
| 2003/0015181 A1 | 1/2003 | Wiik | |

FOREIGN PATENT DOCUMENTS

| | | |
|---|---|---|
| DE | 198 22 874 A1 | 11/1999 |
| EP | 1 170 478 A2 | 1/2002 |
| GB | 2 332 478 A | 6/1999 |

* cited by examiner

HOUSING FOR A TURBOCHARGER

FIELD OF THE INVENTION

The invention relates to a housing for a turbocharger comprising a rotor space for receiving a turbine rotor, which rotor space is surrounded by a housing shell, from which a connection device is provided to at least one waste gas manifold of a combustion engine. The invention relates also to a method for manufacturing such a housing.

BACKGROUND OF THE INVENTION

Connecting a turbocharger to a combustion engine requires generally considerable mounting labor, the connection being generally effected by means of flanges. However, flanges contribute significantly to the weight of the whole arrangement which makes it felt disagreeable considering today's efforts to reduce the total weight of a vehicle.

SUMMARY OF THE INVENTION

It is an object of the present invention to provide a housing for a turbocharger which avoids the disadvantages described above.

According to the invention, this object is achieved in that not only at least part of the housing of the turbocharger, but also the waste gas manifold and the cylinder head are cast in common as one piece.

In this way, it is not only that the heavy flanges are eliminated, but it is also the mounting work for connecting a turbocharger housing to the manifold and the manifold to the cylinder head which is omitted. In this way, as an additional advantage, production costs are reduced. In particular, the relative large entrance flange for the connection of the manifold to the cylinder head, necessary up to now, is also omitted.

Basically, there are numerous constructions imaginable within the scope of the present invention. For example, it would be possible to cast only the axial half of a casing of a rotor space at least together with the waste gas manifold as one piece so that the respective rotor, e.g. a turbine rotor, but optionally as an alternative or in addition a compressor rotor, may be inserted into the half-casing from the front side. In this case, it is also possible to cast, in addition to the half rotor casing, also the bearing housing for supporting the rotor shaft as one piece, as it is likewise possible, e.g. as suggested in the older patent application EP 02 019 178.9 assigned to the same assignee as the present one, to cast the bearing housing and the joining axial half of a rotor housing together with the manifold as one piece. A particularly preferred solutions among all these possibilities resides in that the at least one portion of the casing surrounds at least partially the turbine rotor space of a turbocharger. For in this way, an uninterrupted heat conductive connection at least from the cylinder head is provided which results in heat losses as small as possible on the way towards the turbocharger. This is important, because just when starting a vehicle, a catalyst thereof is still cold and, therefore, hardly effective, because it has to be warmed up by the waste gas. However, by casting the casing integrally as one piece, an undisturbed heat transmission at least from the cylinder head is enabled which provides for quickly heating up the catalyst. In addition, the cold start behavior is improved. A further advantage resides in the fact that by eliminating the traditional flange connections, there are no longer sealing problems, because flange connections are very critical with respect to gas emissions.

If, as is preferred, the at least one portion of the casing of the turbocharger, the waste gas manifold and the cylinder head are cast in common from a light metal, such as aluminum, the weight is further reduced. In this way, it is not only the cylinder head which is made from a light metal, such as aluminum, but optionally also of magnesium at least in part, (as it is the case already nowadays with aluminum cylinder heads), but also the at least partial casing of the turbocharger. In the case of such a well heat conducting metal, one could even consider cooling the casing.

It is clear that those skilled in the art did not for nothing shy away from conceiving such a complicated cast piece. However, production is advantageously effected according to the invention in such a manner that sand core pieces for molding part of the casing of the turbocharger are added to sand core pieces for the cavity of the waste gas manifold, and these, in turn, are added to sand core pieces for casting the cylinder head. They all are interconnected and subsequently inserted into chill forms for the portion of, the casing of the turbocharger, for the waste gas manifold, and for the cylinder head, whereupon liquid metal is filled into the chill forms and is solidified after which the casing portion of the turbocharger together with the manifold and the cylinder head are removed and the cores are also removed.

BRIEF DESCRIPTION OF THE DRAWINGS

Further details of the invention will become apparent from the following description of an embodiment schematically illustrated in the drawings in which.

DETAILED DESCRIPTION OF THE DRAWINGS

Figure 1:
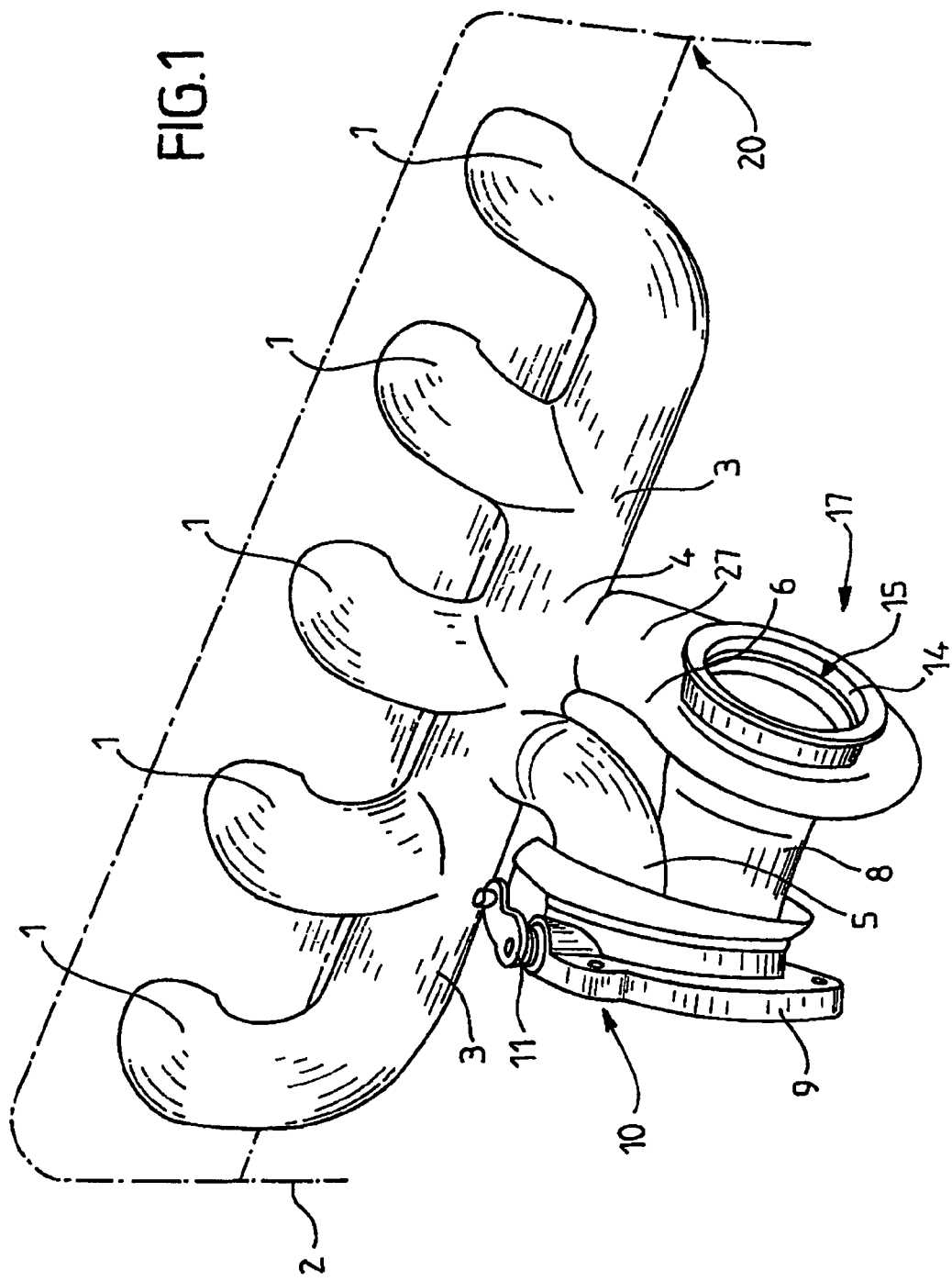
FIG. 1 is a perspective view of a unity of a waste gas manifold and a cylinder head (indicated in dash dotted lines) of a combustion engine together with a turbine casing and a joining valve chamber of a so-called waste-gate of a turbocharger.

From a cylinder head 20 (merely indicated in dash-dotted lines in FIG. 1) of a combustion engine 2, whatever its construction in detail might be, five waste gas elbows 1 lead to a manifold or waste gas collector 3. In a connecting partial section 4 of the manifold 3, there is a connection each to a turbine housing 17, on the one hand, and a valve chamber of a by-pass valve for by-passing the turbine housing 17 and is integrally cast, i.e. in one piece together with the waste gas collector 3 and the cylinder head 20. It should be clear that this represents only an example, while the invention is not restricted to a particular number of elbows 1 or to casting the above-mentioned parts 10, 17 of the turbocharger.

The connecting partial section 4, as mentioned above, provides the communication between the waste gas collector 3 and a turbine housing 17. In this connecting partial section 4 ends also the middle elbow 1 (however, it could be any other elbow, e.g. at one end of the manifold 3). All parts are preferably precision cast parts.

As has been mentioned above, a further connection from the connecting partial section 4 may exist to a by-pass channel 5, through which at least part of the waste gas of the combustion engine 2 situated below the cylinder head 20 may be supplied to another user of the waste gas and/or its energetic contents, such as a catalyst via a flap 10 actuated by a lever 11 and forming the by-pass valve (the arrow indicates merely the place, where the flap is located). It may be seen that the lever 11 is fastened to a shaft supported in a flange 9, to which flange 9 a discharge channel 8 is connected leading out from the turbine housing 17. At least the channel 8, optionally the flange 9 too, may be cast in one piece together with the turbine housing 17, in which case, of course, a core for the channel 8 has to be used during casting. In this case, a special sleeve for accommodating the flap at 10 as well as its actuation shaft with the lever 11 (as was provided in the prior art) may be omitted, if also the associated flap valve housing, in the present embodiment: the flange 9, is also integrally cast. However, it should be noted that it is known in the field of casting magnesium to provide the magnesium casting with an aluminum lining; this technique may also be used in the present invention.

The turbine housing 17 is, as usual, about spirally formed to supply waste gas to a turbine which is not shown in FIG. 1 and is situated in the center of the spiral being inserted in a rotor space 15 within the housing shell 17. The housing shell 17 surrounds at least partly the rotor space 15, as usual, where the rotor of the turbine of traditional type is revolving. If it is spoken of "at least partly", it should means that it would be possible to refrain from integrally casting the by-pass device 5, 10, to leave the axial half of the turbine housing open to this side (where the by-pass device 5, 10 is shown in FIG. 1) to be able to insert the turbine rotor from this side, and to cast, for example, at least the bearing housing of a turbocharger integrally with the other parts, e.g. 17, 3, 1 and 20, at the right side of FIG. 1, optionally also a half compressor housing too. In the present embodiment, however, a bearing housing flange 14 is provided for fastening the bearing housing (not shown, but usually existent in turbochargers), the flange being integrally cast with the housing shell 17.

Figure 2:
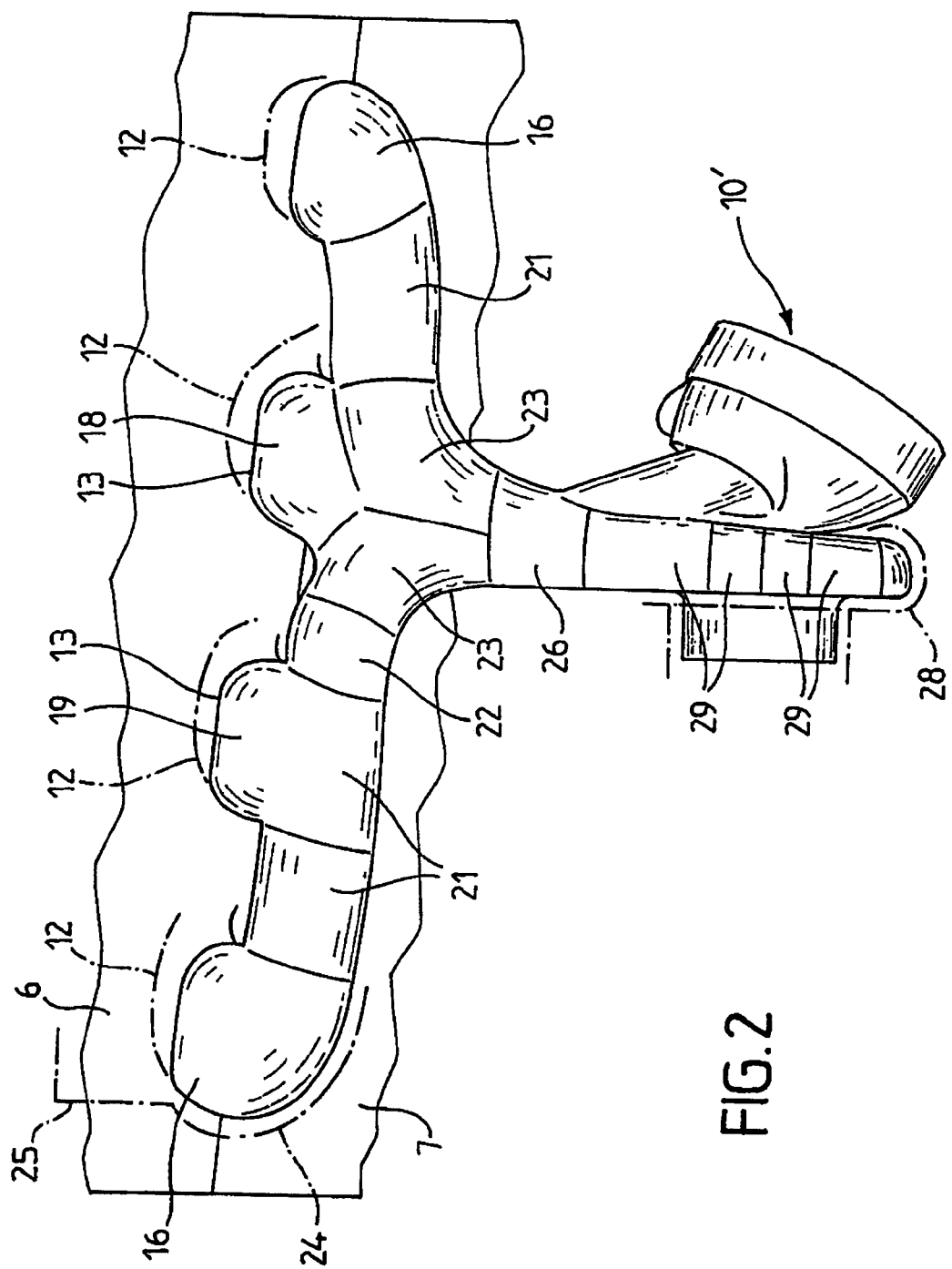
FIG. 2 is a perspective view of the interconnection of cores for producing a unity according to the invention.

In the following description, manufacturing an embodiment similar to the construction shown in FIG. 1 will be described with reference to FIG. 2. This figure shows schematically parts of an upper mold 6 and a lower mold 7 for the cylinder head 20, these mold being formed, for example, the way as is known from rororo-Techniklexikon, Rowohlt Verlag, 1972, page 523. Correspondingly, sand cores 12 indicated in dotted lines, so-called hot-box-cores, are provided within the molds 6, 7. In contrast to the prior art, however, these sand cores 12 are not totally surrounded by the molds 6, 7, but penetrate through openings 13 thereof in order to be connected with further sand cores 16, 18, 19 outside the molds 6, 7 my means of a bonding agent, such as potassium or sodium water glass. These further sand cores 16, 18, 19 together with sand cores 21 to 23 shape the cavity of the manifold 3 (FIG. 1) for which a mold 24 surrounding the sand cores 16, 18, 19 and 21 23 is indicated in dash-dotted lines. This mold 24 has a connection piece 25 which extends about parallel to the upper mold 6 so as to be easily firmly connected to the latter.

All of the above-mentioned sand cores 12, 16, 18, 19 and 21–23 are interconnected in the manner discussed above by a bonding agent in order to form the rather complicated inner shape of the housing to be cast integrally with the cylinder head 20 and the manifold 3 in one piece. Particularly, the joint of the cores 18 and 23 should be noted, of which the latter lead to the housing shell of a turbocharger, as may be seen in FIG. 2. For joining the two cores 23 is a connecting core 26 that forms the supply channel to the turbine housing and to which further sand cores 27 are connected by a bonding agent to form a compact structure, the sand cores 27 being arranged around the rotor space 15 (FIG. 1) of the turbine housing shell 17. These sand cores 27 are surrounded by a turbine mold 28 which is firmly connected to the rest of the molds 6, 7 and 24 so that the necessary cavities are defined everywhere between the molds and the sand cores to fill the metal to be cast, e.g. a light metal, such as aluminum, in. In FIG. 2 may also be seen those cores generally referenced 10' for shaping and forming the by-pass valve housing 10 shown in FIG. 1.

After the cavities between the molds and the sand cores have been filled, the metal is allowed to solidify, after which the casting is released, and the sand cores are removed as is known per se.

Within the scope of the invention, a variety of constructions are possible, as has been mentioned above. For example, the housing shell 17 of the turbocharger could also be interconnected to more than one manifold. Furthermore, it would be possible to cast the compressor housing shell of the turbocharger, instead of the shell surrounding the turbine rotor space as shown in FIG. 1, integrally with the manifold 3 and the cylinder head 20.

The invention claimed is:

1. A housing for a turbocharger comprising
a housing shell surrounding, at least partially, a rotor space;
at least one manifold of a combustion engine;
pipe means for connecting said housing shell with at least one manifold of said combustion engine;
a cylinder head of said combustion engine
wherein not only at least part of the housing shell of the turbocharger, but also said manifold and said cylinder head are integrally cast as one piece.

2. The housing as claimed in claim 1, wherein at least part of said housing shell surrounds a turbine rotor space of said turbocharger.

3. The housing as claimed in claim 1, wherein at least part of said housing shell surrounds a by-pass valve chamber.

4. The housing as claimed in claim 1, wherein at least part of said housing shell of the turbocharger, the manifold and the cylinder head are integrally cast from a light metal.

5. The housing as claimed in claim 4, wherein the light metal is aluminum.

6. The housing as claimed in claim 4, wherein the light metal is at least in part magnesium.

* * * * *